US012330947B2

(12) United States Patent
Takeuchi et al.

(10) Patent No.: US 12,330,947 B2
(45) Date of Patent: Jun. 17, 2025

(54) METHOD FOR PRODUCING SURFACE-MODIFIED NANODIAMOND

(71) Applicant: DAICEL CORPORATION, Osaka (JP)

(72) Inventors: Hidekazu Takeuchi, Tokyo (JP); Naoyoshi Matsuno, Tokyo (JP); Hideo Yagasaki, Tokyo (JP)

(73) Assignee: DAICEL CORPORATION, Osaka (JP)

(*) Notice: Subject to any disclaimer, the term of this patent is extended or adjusted under 35 U.S.C. 154(b) by 743 days.

(21) Appl. No.: 17/634,699

(22) PCT Filed: Aug. 19, 2020

(86) PCT No.: PCT/JP2020/031222
§ 371 (c)(1),
(2) Date: Feb. 11, 2022

(87) PCT Pub. No.: WO2021/039521
PCT Pub. Date: Mar. 4, 2021

(65) Prior Publication Data
US 2022/0324712 A1  Oct. 13, 2022

(30) Foreign Application Priority Data
Aug. 30, 2019 (JP) ................................. 2019-158008

(51) Int. Cl.
*C01B 32/28* (2017.01)
*B82Y 40/00* (2011.01)
*C01B 32/26* (2017.01)

(52) U.S. Cl.
CPC .............. *C01B 32/28* (2017.08); *C01B 32/26* (2017.08); *B82Y 40/00* (2013.01)

(58) Field of Classification Search
CPC ......... C01B 32/28; C01B 32/26; C01B 32/25; B82Y 40/00; B82Y 30/00; B01J 3/06; B01J 3/062; B01J 3/065; B01J 3/067; B01J 3/08; C30B 29/04; C23C 16/26; C23C 16/27; C23C 16/271; C23C 16/272; C23C 16/274; C23C 16/275; C23C 16/276; C23C 16/277; C23C 16/278; C23C 16/279; C23C 14/06; C23C 14/0605; C23C 14/0611
See application file for complete search history.

(56) References Cited

U.S. PATENT DOCUMENTS

| | | | |
|---|---|---|---|
| 8,410,196 B2 | 4/2013 | Komatsu et al. | |
| 2010/0201928 A1 | 10/2010 | Komatsu et al. | |
| 2010/0261926 A1* | 10/2010 | Komatsu | C07C 43/135 977/788 |

FOREIGN PATENT DOCUMENTS

| | | | |
|---|---|---|---|
| JP | 2007-238411 A | 9/2007 | |
| JP | 2008-150250 A | 7/2008 | |
| JP | 2008-303104 A | 12/2008 | |
| JP | 2010-248023 A | 11/2010 | |
| JP | 2012-82103 A | 4/2012 | |
| JP | 2018-70412 A | 5/2018 | |
| JP | 2018070412 A * | 5/2018 | B82Y 40/00 |

OTHER PUBLICATIONS

International Preliminary Report on Patentability and Written Opinion of the International Searching Authority for International Application No. PCT/JP2020/031222 dated Mar. 1, 2022, with an English translation.
International Search Report for International Application No. PCT/JP2020/031222, dated Oct. 27, 2020, with an English translation.

* cited by examiner

*Primary Examiner* — Daniel C. McCracken
(74) *Attorney, Agent, or Firm* — Birch, Stewart, Kolasch & Birch, LLP (57) ABSTRACT

Provided is a method for producing a surface-modified nanodiamond having its surface modified with a group containing a polyglycerin chain in an industrially efficient and safe manner, the surface-modified nanodiamond having excellent solubility or dispersibility in water and a polar organic solvent and great dispersion stability. In an aliphatic alcohol solvent having from 2 to 4 carbon atoms, a nanodiamond or a surface-modified nanodiamond having its surface modified with a group represented by Formula (1): —$X^1$—H (1), where in Formula (1), $X^1$ represents —NH—, —O—, —COO—, or the like, is subjected to ring-opening addition polymerization with glycidol, so as to obtain a surface-modified nanodiamond having its surface modified with a group containing a polyglycerin chain represented by Formula (2): —X—R (2), where in Formula (2), X represents a single bond, —NH—, —O—, —COO—, or the like, and R represents a polyglyceryl group.

20 Claims, 4 Drawing Sheets

METHOD FOR PRODUCING SURFACE-MODIFIED NANODIAMOND

TECHNICAL FIELD

The present disclosure relates to a method for producing a surface-modified nanodiamond. The surface-modified nanodiamond can be used in the field of engineering application, examples of which including polishing agents for Chemical Mechanical Polishing (CMP), dresser materials, corrosion-resistant electrode plating materials for fuel cells, high-hardness surface coating layer forming materials for cutting tools and the like, high heat-resistance and high thermal-conductivity materials, lubricants, and insulating materials. The present patent application claims priority from the Japanese Patent Application No. 2019-158008, filed in Japan on Aug. 30, 2019, the contents of which are incorporated herein by reference.

BACKGROUND ART

Besides the inherent properties as diamonds, nanodiamonds also have characteristics such as small average particle diameters and large specific surface areas. Furthermore, nanodiamonds are relatively inexpensive and easily available.

Nanodiamonds are produced by a detonation method, a high-temperature high-pressure method, a static high-pressure method, a fluxing method, or the like. In the detonation method, nanodiamond particles are produced by purifying, with a chemical treatment, the explosion soot obtained by exploding an explosive sealed; and removing water by methods such as an ultra-centrifugal separation method, a concentrating-drying method, a freeze-drying method, and a spray dryer method from the aqueous dispersion obtained by grinding the purified soot dispersed in water with a disperser such as a bead mill or an ultrasonic homogenizer. The nanodiamond obtained by such a method has high solubility and dispersibility in water, but contains many other carbonaceous matters such as amorphous carbon and graphite, and has the problem that a surface chemical modification is difficult. In contrast, the high-temperature high-pressure method is, for example, a method in which a raw graphite powder is kept under a high pressure from 1 to 10 GPa and at a high temperature from 800 to 2000° C. in the presence of a metal such as iron or cobalt in a sealed high-pressure container. The nanodiamond obtained by this method has only few other carbonaceous matters such as amorphous carbon or graphite, and also has uniformity in particle diameter, but has the problem of low solubility, dispersibility, and dispersion stability in water and in organic solvents. Thus, the development of nanodiamond application has not advanced much.

For improving solubility or dispersibility in water and organic solvents, attempts have been made to chemically modify the surfaces of nanodiamonds (see Patent Documents 1 to 3). The solubility or dispersibility in water or polar organic solvents and the dispersion stability, however, have not been considered necessarily sufficient.

Patent Documents 4 and 5 disclose surface-modified nanodiamonds that have nanodiamond surfaces modified with groups including polyglycerin chains. According to these documents, a nanodiamond or a nanodiamond having a reactive functional group on its surface is heated with glycidol in the presence of a catalyst for producing the surface-modified nanodiamond. However, in this method, because the nanodiamond and the glycidol are reacted without any solvent, there is a possibility that the temperature control in scaled-up manufacturing becomes difficult, causing runaway reactions and thus making industrialization challenging.

CITATION LIST

Patent Documents

Patent Document 1: JP 2007-238411 A
Patent Document 2: JP 2008-303104 A
Patent Document 3: JP 2008-150250 A
Patent Document 4: JP 2010-248023 A
Patent Document 5: JP 2012-082103 A

SUMMARY OF INVENTION

Technical Problem

Accordingly, an object of the present disclosure is to provide a method for producing a surface-modified nanodiamond having its surface modified with a group containing a polyglycerin chain in an industrially efficient and safe manner, the surface-modified nanodiamond having excellent solubility or dispersibility in water and a polar organic solvent and great dispersion stability.

Solution to Problem

As a result of diligent studies for achieving the object mentioned above, the inventors of the present disclosure have found that, when a nanodiamond or a nanodiamond having on its surface a functional group that can react with glycidol is reacted with glycidol in a specific solvent, the reaction proceeds smoothly without runaway, allowing to produce a surface-modified nanodiamond having its surface modified with a group containing a polyglycerin chain in an industrially efficient manner. The present disclosure has been completed based on such findings.

More specifically, as an embodiment of the present disclosure, a method for producing a surface-modified nanodiamond is provided, in that the method including subjecting a nanodiamond or a surface-modified nanodiamond to ring-opening addition polymerization with glycidol in an aliphatic alcohol solvent having from 2 to 4 carbon atoms, the surface-modified nanodiamond having its surface modified with a group represented by Formula (1):

$$-X^1-H \qquad (1)$$

where in Formula (1), $X^1$ represents —NH—, —O—, —COO—, —PH(=O)O—, —S—, —SO$_3$—, —SO$_2$—, or —SiO—, so as to obtain a surface-modified nanodiamond having its surface modified with a group containing a polyglycerin chain represented by Formula (2):

$$-X-R \qquad (2)$$

where in Formula (2), X represents a single bond, —NH—, —O—, —COO—, —PH(=O))—, —S—, —SO$_3$—, —SO$_2$—, or —SiO—, and R represents a polyglyceryl group.

In the production method mentioned above, the reaction is preferably conducted on heating by sequentially adding glycidol to a liquid mixture of the aliphatic alcohol solvent having from 2 to 4 carbon atoms and the raw material nanodiamond or surface-modified nanodiamond.

In addition, the raw material nanodiamond or surface-modified nanodiamond is preferably a powder obtained by drying ζ (zeta)-positive single-digit nanodiamond dispersion.

Further, the aliphatic alcohol solvent having from 2 to 4 carbon atoms is used in an amount preferably from 10 to 2000 parts by weight relative to 1 part by weight of the raw material nanodiamond or surface-modified nanodiamond.

Next, the glycidol is used in an amount preferably from 10 to 2000 parts by weight relative to 1 part by weight of the raw material nanodiamond or surface-modified nanodiamond.

Furthermore, the ring-opening addition polymerization is conducted preferably at a temperature from 40 to 180° C.

Advantageous Effects of Invention

According to the present disclosure, the nanodiamond or the nanodiamond having on its surface a functional group that can react with glycidol is reacted with glycidol in the specific solvent, the reaction proceeds smoothly without runaway, allowing to produce a surface-modified nanodiamond having its surface modified with a group containing a polyglycerin chain in an industrially efficient and safe manner. In addition, the present disclosure can be adapted in scaled-up manufacturing.

DESCRIPTION OF EMBODIMENTS

Figure 1:
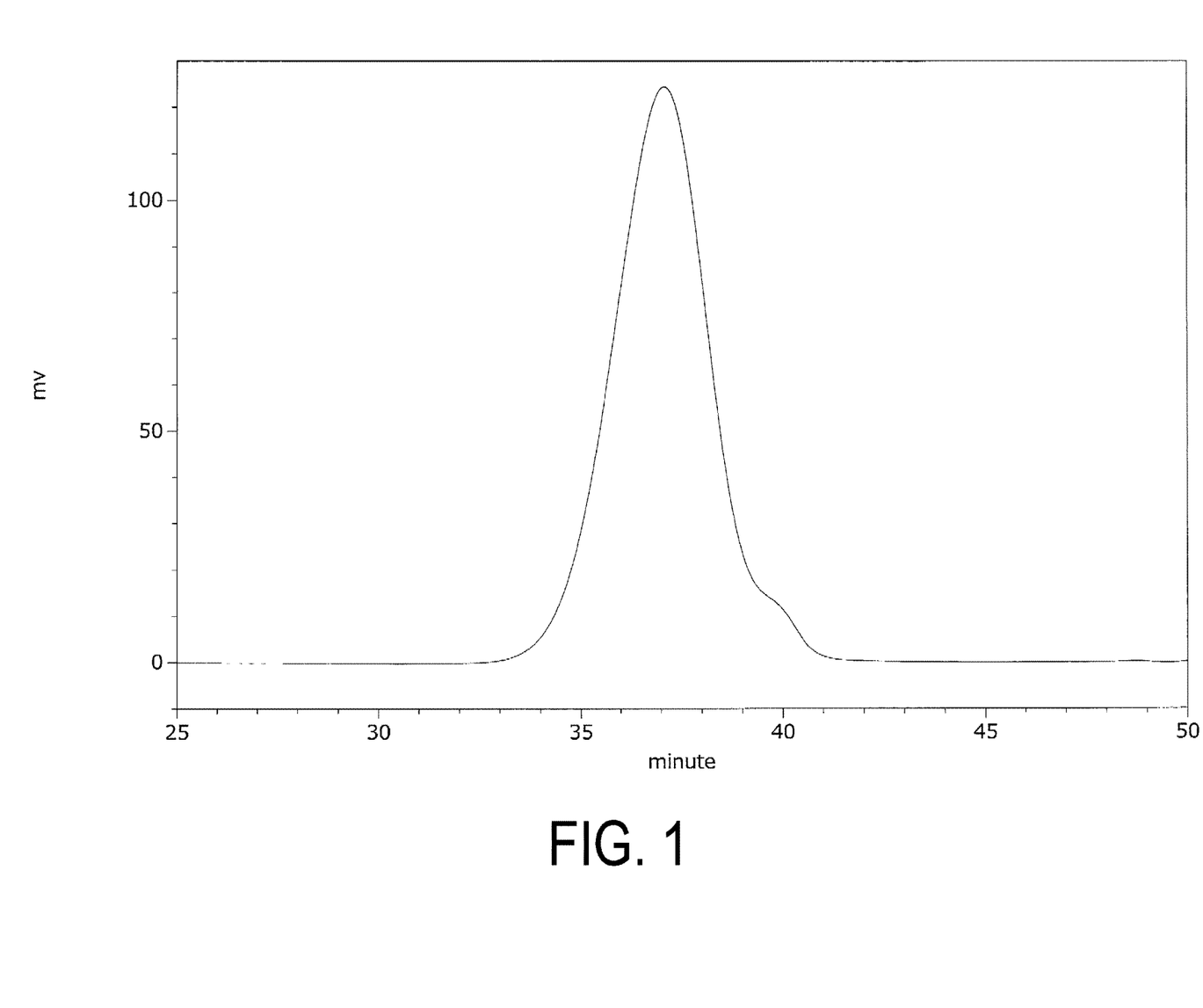
FIG. 1 is a GPC measurement chart of a surface-modified nanodiamond having its surface modified with a polyglycerin chain-containing group, which was obtained in Example 8 (RI detector).
Figure 2:
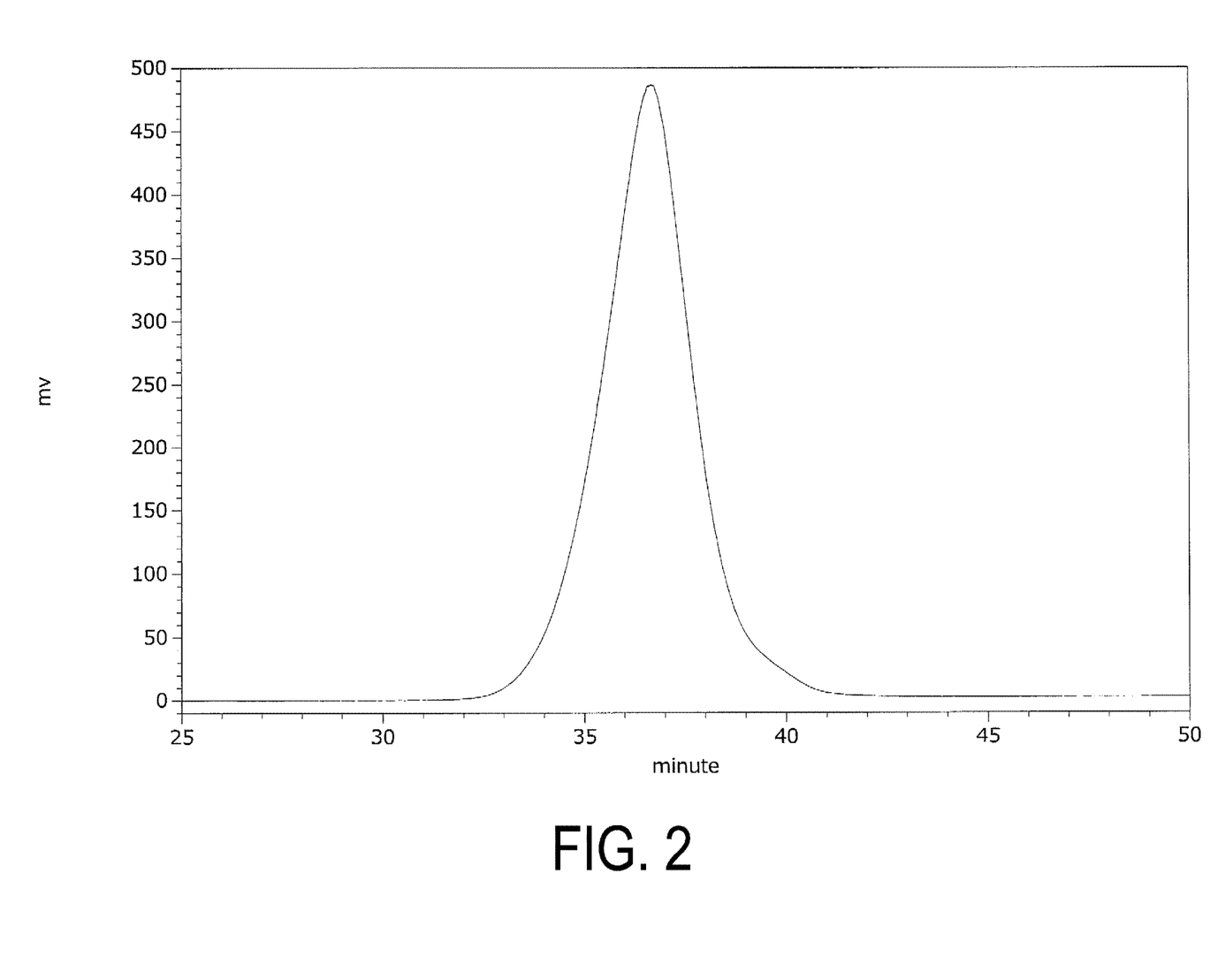
FIG. 2 is a GPC measurement chart of a surface-modified nanodiamond having its surface modified with a polyglycerin chain-containing group, which was obtained in Example 8 (UV 254 detector).
Figure 3:
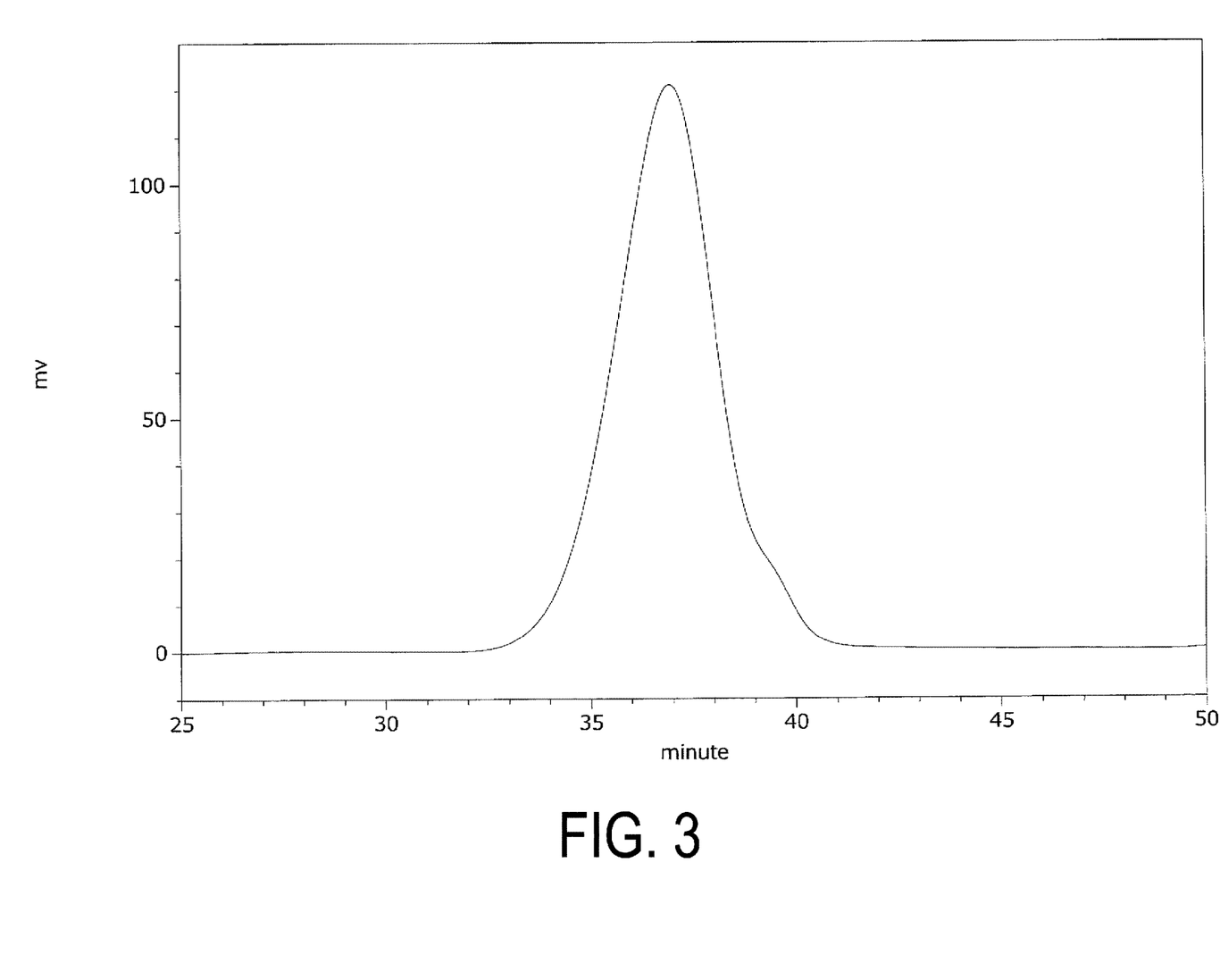
FIG. 3 is a GPC measurement chart of a surface-modified nanodiamond having its surface modified with a polyglycerin chain-containing group, which was obtained in Reference Example 1 (known formulation) (RI detector).
Figure 4:
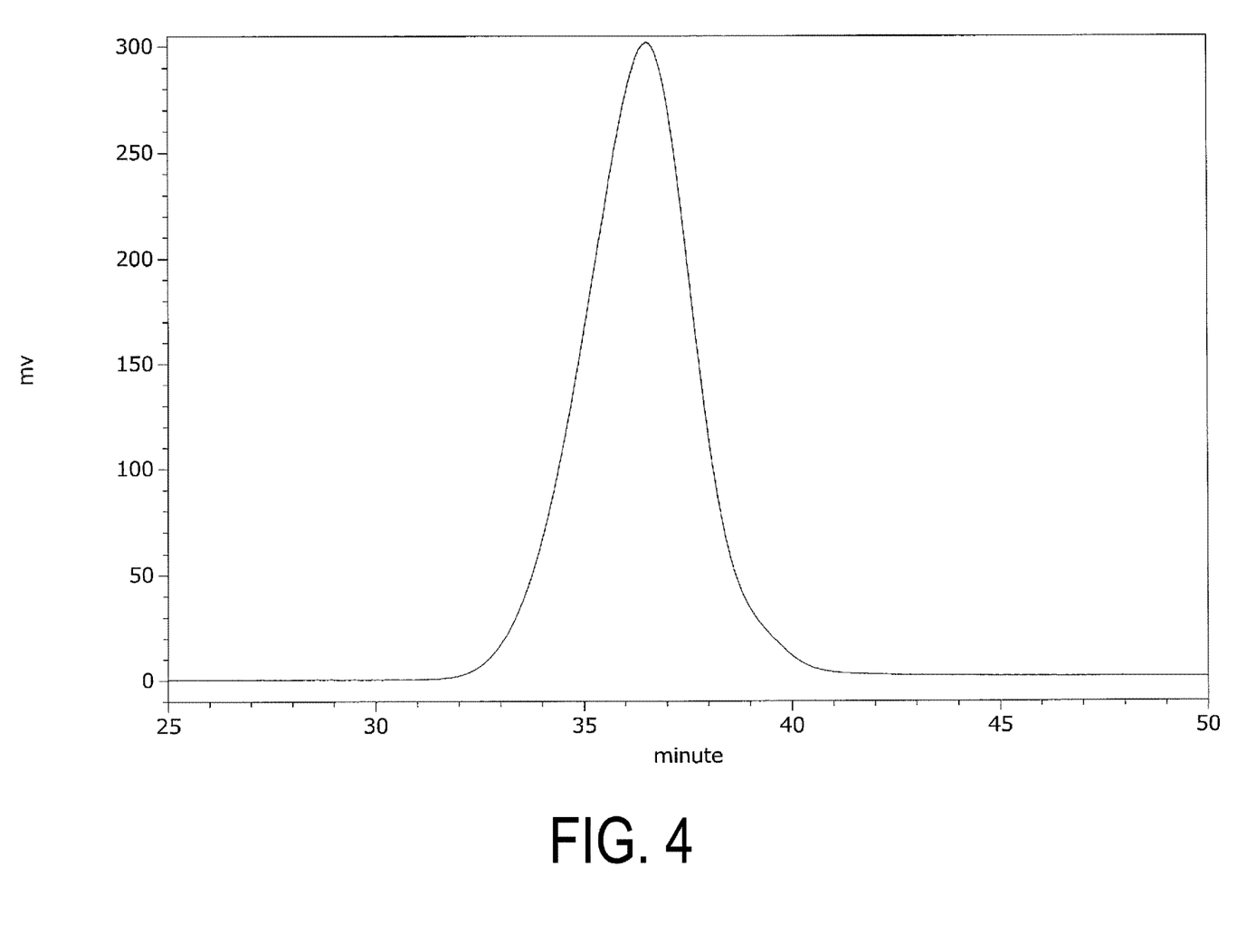
FIG. 4 is a GPC measurement chart of a surface-modified nanodiamond having its surface modified with a polyglycerin chain-containing group, which was obtained in Reference Example 1 (known formulation) (UV 254 detector).

In the method for producing a surface-modified nanodiamond according to an embodiment of the present disclosure, a nanodiamond or a surface-modified nanodiamond having its surface modified with a group represented by Formula (1) is subjected to ring-opening addition polymerization with glycidol in an aliphatic alcohol solvent having from 2 to 4 carbon atoms, so as to obtain a surface-modified nanodiamond having its surface modified with a group containing a polyglycerin chain represented by Formula (2). In Formula (1), $X^1$ represents —NH—, —O—, —COO—, —PH(=O)O—, —S—, —SO$_3$—, —SO$_2$—, or —SiO—. In Formula (2), X represents a single bond, —NH—, —O—, —COO—, —PH(=O)O—, —S—, —SO$_3$—, —SO$_2$—, or —SiO—, where R represents a polyglyceryl group. Hereinafter, a surface-modified nanodiamond having its surface modified with a group containing a polyglycerin chain represented by Formula (2) may be referred to as "ND-X—R". ND herein represents a nanodiamond.

[Nanodiamond as Raw Material]

In one embodiment of the present disclosure, the nanodiamond for use as a raw material may be produced by any method such as a detonation method, a high-temperature high-pressure method, a static high-pressure method, and a fluxing method. In the present disclosure, from the perspective of being capable of obtaining nanodiamond particles that are extremely small in the average particle size of primary particles, the nanodiamond is preferably derived from a diamond produced by a detonation method (in particular, an oxygen-deficient detonation method). The detonation method includes a water-cooling detonation method and an air-cooling detonation method that differ in heat removal method. In an embodiment of the present disclosure, from the perspective of having a small average primary particle size and a large specific surface area, the nanodiamond is preferably derived from a diamond synthesized by, in particular, an air-cooling detonation method. In one embodiment of the present disclosure, for a nanodiamond to be used as a raw material, a commercially available product may be used, or a synthesized nanodiamond may be used.

In the detonation method, the nanodiamond particles are produced by purifying, with a chemical treatment (for example, an acid treatment, an oxidation treatment, or a hydrogenation treatment), the explosion soot obtained by exploding an explosive sealed; and removing water by methods such as an ultra-centrifugal separation method, a concentrating-drying method, a freeze-drying method, and a spray dryer method from the aqueous dispersion obtained by grinding (disintegrating) the purified soot dispersed in water with a disperser such as a bead mill or an ultrasonic homogenizer.

The surfaces of the nanodiamond particles produced by the detonation method or the like often have various functional groups, which differ depending on the production process. Examples of the functional groups include —NH$_2$, —OH, —COOH, —PH(=O)OH, —SH, —SO$_3$H, —SO$_2$H, and —SiOH. These functional groups can react with glycidol.

The particle diameter D50 (median diameter) of the raw material nanodiamond (ND) is from 3 to 200 nm in a preferred aspect of the present disclosure, from 7 to 100 nm in another preferred aspect thereof, and from 10 to 40 nm in yet another preferred aspect thereof.

[Surface-Modified Nanodiamond as Raw Material]

In one embodiment of the present disclosure, for the surface-modified nanodiamond having its surface modified with a group represented by Formula (1), a commercially available product may be used, or a synthesized nanodiamond may be used. The surface-modified nanodiamond can be obtained from a nanodiamond (ND) and a reactant for introducing a surface-modifying group by utilizing a known method or reaction. For introducing the modifying group into the nanodiamond, the reactant corresponding to the modifying group may be reacted directly, but the nanodiamond may be reduced once in a hydrogen stream, by heating the reactant to, for example, from 400 to 1000° C. to form a hydrogenated nanodiamond (ND-H) (see JP 2007-238411 A), and reacted with the reactant corresponding to the modifying group.

The particle diameter D50 (median diameter) of the nanodiamond (ND) or hydrogenated nanodiamond (ND-H) that is used as a raw material for producing the raw material surface-modified nanodiamond is from 3 to 200 nm in a preferred aspect of the present disclosure, from 7 to 100 nm in another preferred aspect thereof, and from 10 to 40 nm in yet another preferred aspect thereof. The particle size of the raw material nanodiamond is selected, thereby allowing a surface-modified nanodiamond with a particle size suitable for the purpose to be obtained. A variety of particle sizes can be obtained depending on production methods and conditions for producing a nanodiamond from a graphite, and the conditions for classification after the production, and a variety of particle sizes obtained by various production methods are available from existing manufacturers.

Of surface-modified nanodiamonds that have a surface modified with a group represented by Formula (1) above, the surface-modified nanodiamond where $X^1$ is —NH— can be produced, for example, by introducing an amino group into a hydrogenated nanodiamond (ND-H). The introduction of the amino group into the hydrogenated nanodiamond (ND-H) is achieved, for example, by heating the ND-H in an ammonia stream to from 300 to 800° C. In addition, it is also possible to chlorinate the ND-H in a chlorine stream prior to reacting the ND-H with ammonia, and then react the chlorinated ND-H with ammonia (see JP 2007-238411 A).

Of the surface-modified nanodiamonds that have a surface modified with a group represented by Formula (1) above, the surface-modified nanodiamond where X' is —O— can be produced, for example, by introducing a hydroxyl group into a hydrogenated nanodiamond (ND-H). The introduction of the hydroxyl group into the ND-H is achieved by, for example, esterifying the ND-H in an acetic acid by adding a benzoyl peroxide and then heating, and hydrolyzing the esterified ND-H with an acid or an alkali by a common method.

Of the surface-modified nanodiamonds that have a surface modified with a group represented by Formula (1), the surface-modified nanodiamond where $X^1$ is —COO— can be obtained, for example, by the following method. More specifically, the nanodiamond can be produced in a manner that a nanodiamond can be dispersed in an appropriate dispersion medium such as a methylene chloride, unsaturated groups that are present on the nanodiamond surface are oxidized and raptured with ozone to produce an aldehyde group, and the aldehyde group is further oxidized with air to form a carboxyl group.

Of the surface-modified nanodiamonds that have a surface modified with a group represented by Formula (1), the surface-modified nanodiamond where X' is —PH(=O)O— can be obtained by the following method. More specifically, the surface-modified nanodiamond can be produced by, for example, irradiating, with ultraviolet rays (254 nm), the surface of a hydrogenated nanodiamond (ND-H) dispersed in an isopropyl alcohol to generate radicals, and capturing the radicals with an appropriate phosphorus compound (for example, a phosphorus acid or the like) to introduce a phosphinic acid group to the nanodiamond surface.

Of the surface-modified nanodiamonds that have a surface modified with a group represented by Formula (1), the surface-modified nanodiamond where $X^1$ is —PH(=O)— can be produced by, for example, irradiating, with ultraviolet rays (254 nm), the surface of a hydrogenated nanodiamond (ND-H) to generate radicals, capturing the radicals with an appropriate alkyl mercaptan or dialkyl disulfide to introduce an alkylthio group to the nanodiamond surface, and removing the alkyl group with an appropriate deprotection reagent. For example, a nanodiamond having thiol groups on the surface can be produced by reacting bis(4-methoxybenzyl) disulfide to introduce 4-methoxybenzylthio groups while irradiating a nanodiamond dispersed in an isopropanol with ultraviolet rays of 254 nm, and then removing the methoxybenzyl group with a liquid trimethylsilyl bromide-TFA mixture.

The raw material nanodiamond or surface-modified nanodiamond in the present disclosure may be a solid (such as a powder) obtained by drying ζ-potential positive nanodiamond dispersion (preferably, ζ-potential positive single-digit nanodiamond dispersion), or a solid (such as a powder) obtained by drying a ζ-potential negative nanodiamond dispersion (preferably, a ζ-potential negative single-digit nanodiamond dispersion), but a solid (such as a powder) obtained by drying ζ-potential positive nanodiamond dispersion (in particular, a ζ-potential positive single-digit nanodiamond dispersion) is more preferred in that post treatment after the reaction with glycidol (ring-opening addition polymerization with glycidol) can be simplified. It is to be noted that a ζ-potential positive nanodiamond dispersion (preferably, a ζ-potential positive single-digit nanodiamond dispersion), or a ζ-potential negative nanodiamond dispersion (preferably, a ζ-potential negative single-digit nanodiamond dispersion) can be used as it is or in an in incompletely dried wet state, to the extent that the reaction with the glycidol is not impaired. It is to be noted that in the case of a "nanodiamond dispersion", the dispersion is intended to mean both a dispersion of a raw material nanodiamond and a dispersion of a raw material surface-modified nanodiamond. In addition, the "single-digit nanodiamond" refers to nanodiamond particles of less than 10 nm in particle diameter D50 (median diameter).

The ζ-potential positive (that is, the ζ-potential has a positive value) nanodiamond dispersion can be produced, for example, by applying an acid treatment process, a solution oxidation treatment process, an alkaline hydrogen peroxide treatment process, and an oxygen oxidation process, as necessary, to a crude product of diamond produced by a detonation method or the like; then applying a hydrogenation treatment process and a disintegration process thereto; and performing an operation for classification, if necessary (see JP 2018-70412 A). In the oxygen oxidation process described above, when an oxygen oxidation reaction of non-diamond carbon is developed with the non-diamond carbon such as graphite or amorphous carbon being present on the surface of the nanodiamond, carbon dioxide is generated and the non-diamond carbon from the nanodiamond surface is eliminated. In addition, in the oxygen oxidation process described above, when an oxygen oxidation reaction proceeds at the surface of the nanodiamond itself, the nanodiamond surface is modified with oxygen. Specifically, functional groups or partial structures containing oxygen atoms will be formed on the nanodiamond surface. Examples of such functional groups or partial structures include carbonyl groups, carboxy groups, lactone structures, and acid anhydride structures. Further, in the hydrogenation process described above, when a hydrogenation reaction proceeds with a functional group or partial structure, such as a carboxyl group containing an oxygen atom, with the functional group or partial structure being present on the nanodiamond surface, the functional group or the like will form a hydrogen reduction product or be eliminated from the nanodiamond surface.

The ζ-potential of the ζ-potential positive (that is, the ζ-potential has a positive value) nanodiamond dispersion is, from the perspective of stably maintaining the dispersion state of nanodiamond particles (including surface-modified nanodiamond particles), 30 mV or higher in a preferred aspect of the present disclosure, 35 mV or higher in another preferred aspect thereof, and 40 mV or higher in yet another preferred aspect thereof. In the present disclosure, the zeta potential of nanodiamond particles (including surface-modified nanodiamond particles) included in the nanodiamond dispersion has a value measured at 25° C. for nanodiamond particles in a nanodiamond dispersion with a nanodiamond concentration of 0.2% by mass. If there is a need to dilute the nanodiamond dispersion stock solution for preparing the nanodiamond dispersion with a nanodiamond concentration of 0.2% by mass, ultrapure water will be used as a diluting liquid.

The ζ-potential negative (that is, the ζ-potential has a negative value) nanodiamond dispersion can be produced, for example, by applying an acid treatment process, a solution oxidation treatment process, or an alkaline hydrogen peroxide treatment process, or further applying an oxygen oxidation process, if necessary, to a crude product of diamond produced by a detonation method or the like; then applying a disintegration treatment thereto in a condition with pH adjusted to alkali; and performing an operation for classification, as necessary (see JP 2018-70411 A). During the disintegration treatment, the ζ potential can be made negative by the pH adjustment to the alkaline side for the nanodiamond particles subjected to the disintegration treatment. Note that in the processes described above, applying the disintegration treatment in a condition with pH adjustment to acid instead of applying the disintegration treatment in the condition with pH adjustment to alkali can make the ζ potential positive for the nanodiamond particles subjected to the disintegration treatment.

The ζ-potential of the ζ-potential negative (that is, the ζ-potential has a negative value) nanodiamond dispersion is, from the perspective of stably maintaining the dispersion state of nanodiamond particles (including surface-modified nanodiamond particles), −30 mV or lower in a preferred aspect of the present disclosure, −35 mV or lower in another preferred aspect thereof, and −40 mV or lower in yet another preferred aspect thereof.

The nanodiamond dispersion can be dried by removing moisture in accordance with a known method such as an ultracentrifugation method, a concentrating-drying method, a freeze-drying method, a spray dryer method, or the like, as mentioned above. The dried solid can be turned into a powder by pulverization, classification, or the like, for example.

[Aliphatic Alcohol Solvent having from 2 to 4 Carbon Atoms]

Examples of the aliphatic alcohol having from 2 to 4 carbon atoms for use as the solvent include aliphatic monohydric alcohols of ethanol, propanol, isopropyl alcohol, n-butanol, isobutyl alcohol, sec-butyl alcohol, and tert-butyl alcohol; and aliphatic polyhydric alcohols such as ethylene glycol, propylene glycol, 1,3-propanediol, 1,3-butanediol, 1,4-butanediol, and glycerin. Among these examples, the aliphatic alcohols having from 2 to 3 carbon atoms are preferred. The aliphatic alcohols having from 2 to 4 carbon atoms have the properties of extremely low reactivity with glycidol, moderately high boiling point (70° C. or higher), and high polyglycerin solubility (30° C., 80° C.). Thus, side reactions can be inhibited, the reaction rate can be increased, and furthermore, the nanodiamond surface-modified with a group containing the produced polyglycerin chain are less likely to settle out.

[Reaction]

In the present disclosure, the raw material nanodiamond or surface-modified nanodiamond is subjected to ring-opening addition polymerization with glycidol in the aliphatic alcohol solvent having from 2 to 4 carbon atoms to produce a surface-modified nanodiamond modified with a group containing a polyglycerin chain represented by Formula (2).

The reaction (ring-opening addition polymerization) of the raw material nanodiamond or surface-modified nanodiamond with glycidol can be conducted by, for example, heating a liquid mixture of the aliphatic alcohol solvent having from 2 to 4 carbon atoms and the raw material nanodiamond or surface-modified nanodiamond to from 40 to 180° C. in a preferred aspect of the present disclosure, from 60 to 150° C. in another preferred aspect thereof, or from 80 to 125° C. in yet another preferred aspect thereof), and sequentially adding glycidol. The reaction is preferably conducted under an inert gas atmosphere. If the reaction temperature is excessively low, the reaction rate will be decreased, and conversely, if the reaction temperature is excessively high, by-products are more likely to produced. Further, a catalyst may be used for the reaction. The catalyst may be added in advance to the liquid mixture of the aliphatic alcohol solvent having from 2 to 4 carbon atoms and the raw material nanodiamond or surface-modified nanodiamond, or may be added sequentially to the liquid mixture in the sequential addition of the glycidol. The time for the sequential addition of the glycidol varies depending on the scale, but is from 10 minutes to 24 hours in a preferred aspect of the disclosure, and from 20 minutes to 2 hours in another preferred aspect thereof. In addition, aging is preferably performed at the above-mentioned temperature for a predetermined period of time after completing the sequential addition of the glycidol. The aging time is, from 10 minutes to 24 hours in a preferred aspect of the present disclosure, and from 20 minutes to 6 hours in another preferred aspect thereof.

The catalyst may be either an acidic catalyst or a basic catalyst. Preferred examples of the acidic catalyst include boron trifluoride etherate, acetic acid, and phosphoric acid, and Preferred examples of the basic catalyst include triethylamine, pyridine, dimethylaminopyridine, and triphenylphosphine. It is to be noted that the reaction proceeds smoothly without using any catalyst.

The aliphatic alcohol solvent having from 2 to 4 carbon atoms is used in an amount from 10 to 2000 parts by weight in a preferred aspect of the present disclosure, from 15 to 300 parts by weight in another preferred aspect thereof, and from 20 to 200 parts by weight in yet another embodiment thereof, relative to 1 part by weight of the raw material nanodiamond or surface-modified nanodiamond. The glycidol is used in an amount from 10 to 2000 parts by weight in a preferred aspect of the present disclosure, from 15 to 300 parts by weight in another preferred aspect thereof, and from 20 to 200 parts by weight in yet another embodiment thereof, relative to 1 part by weight of the raw material nanodiamond or surface-modified nanodiamond.

The reaction can be stopped by cooling the liquid reaction mixture, or adding, for example, water into the reaction system. In addition, the product can be purified by a known method, for example, washing with a solvent, centrifugation, membrane filtration, drying, or the like. This purifying operation can remove the solvent, the excess glycidol, byproduct (such as polyglycerin). Accordingly, the surface-modified nanodiamond modified with the group containing the polyglycerin chain represented by Formula (2) can be obtained as a dispersion or as a powder.

The method according to the present disclosure makes it possible to obtain a surface-modified nanodiamond surface-modified with a polyglycerin chain-containing group, which has, for example, the following physical properties:

(i) The ratio of the surface-modifying group to the nanodiamond (ND) (modifying group weight/ND weight) (=modification ratio) is from 0.2 to 3.0, from 0.4 to 2.4 in a preferred aspect, and from 0.6 to 1.8 in another preferred aspect. This ratio can be determined by TG/DTA measurement.

(ii) The particle diameter D50 (median diameter) is from 20 to 60 nm, and from 30 to 50 nm in one preferred aspect. The particle diameter D50 (median diameter) can be measured by DLS (dynamic light scattering method).

(iii) Mixing with an aqueous solution of sodium nitrate causes no precipitation or turbidity.

(iv) In a GPC measurement, the main component peak has approximately the same position (retention time) and shape as a known formulation (Production Example 1 of Patent Document 5), and no other by-products (impurities) are detected.

The surface-modified nanodiamond surface-modified with the polyglycerin chain-containing group obtained by the method according to the present disclosure, or a dispersion thereof can be used in the various applications described above, and can be suitably used as a material for plating film formation (plating material), particularly because of being capable of suitably maintaining a dispersion state even in a plating liquid. A plating film formed using the surface-modified nanodiamond is not only excellent in surface glossiness but also excellent in strength and electric conductivity.

Each aspect disclosed in the present specification can be combined with any other feature disclosed herein. The configurations, combinations thereof, and the like in each embodiment of the present invention are examples, and various configurational additions, omissions, substitutions, and other changes may be made as appropriate without departing from the spirit of the present invention. Furthermore, inventions according to the present invention are not limited by the embodiments or the following examples, but are limited only by the claims.

EXAMPLES

Hereinafter, the present disclosure will be described in more detail based on examples, but the present disclosure is not limited by these examples.

Production Example 1

Production of Powder from Dried ζ-Positive Single-Digit Nanodiamond Dispersion

[Nanodiamond Dispersion]

A nanodiamond dispersion was produced through the following processes of formation, purification, oxygen oxidation, hydrogenation, and disintegration.

In the formation, first, an electric detonator was attached to a molded explosive and then placed inside a pressure-resistant detonation vessel, and the vessel was sealed. The vessel was made of iron and had a capacity of 15 m$^3$. A mixture, 0.50 kg, of trinitrotoluene (TNT) and cyclotrimethylenetrinitroamine, namely hexogen (RDX), was used as the explosive. The mass ratio of TNT and RDX (TNT/RDX) in the explosive is 50/50. Next, the electric detonator was triggered, and the explosive was detonated in the vessel. Then the temperatures of the vessel and the inside of the vessel were decreased by allowing the vessel to stand at room temperature for 24 hours. After the cooling, a nanodiamond crude product (containing the aggregate of the nanodiamond particles and soot formed in the above detonation method), which adhered to the inner wall of the vessel, was scraped with a spatula, and the nanodiamond crude product was thereby collected.

Next, the nanodiamond crude product obtained by performing the formation described above multiple times was subjected to an acid treatment in the purification. Specifically, a slurry obtained by adding 6 L of a 10% by mass hydrochloric acid to 200 g of the nanodiamond crude product was subjected to a heat treatment under reflux at normal pressure conditions for 1 hour. The heating temperature in this acid treatment was from 85 to 100° C. Then, after cooling, the solid (containing the nanodiamond agglutinates and soot) was washed with water by decantation. The solid was repeatedly washed with water by decantation until the pH of the precipitation solution reached 2 from the low pH side.

Next, a solution oxidation treatment or a mixed acid treatment was performed in the purification. Specifically, a slurry was formed by adding 6 L of a 98 mass % sulfuric acid aqueous solution and 1 L of a 69 mass % nitric acid aqueous solution to the precipitation solution (containing the nanodiamond aggregates) obtained through decantation after the acid treatment, and then the slurry was subjected to a heat treatment under reflux at normal pressure conditions for 48 hours. The heating temperature in this oxidation treatment was from 140 to 160° C. Then, after cooling, the solid (containing the nanodiamond agglutinates) was washed with water by decantation. The initial supernatant liquid from the water washing was colored, and therefore washing of the solid content with water by decantation was repeated until the supernatant liquid became visually clear.

Next, a slurry was formed by adding 1 L of a 10 mass % sodium hydroxide aqueous solution and 1 L of a 30 mass % hydrogen peroxide aqueous solution to a precipitation solution (containing nanodiamond aggregates) obtained through decantation after the solution oxidation treatment, and subsequently, the slurry was heated under reflux for 1 hour at normal pressure conditions (alkali-hydrogen peroxide treatment). The heating temperature in this treatment was from 50 to 105° C. The supernatant was then removed by decantation after cooling. Then, the residual fraction was subjected to a drying treatment, thereby providing a dry powder. As a technique for the drying treatment, evaporation to dryness performed by using an evaporator was adopted.

The oxygen oxidation was then performed using a gas atmosphere furnace (trade name "Gas Atmosphere Tube Furnace KTF045N1", available from Koyo Thermo Systems Co., Ltd.). Specifically, 4.5 g of the nanodiamond powder obtained as described above was allowed to stand inside a furnace core tube of the gas atmosphere furnace, and nitrogen gas was continuously passed through the furnace core tube at a flow rate of 1 L/minute for 30 minutes. Then, the flowing gas was switched from nitrogen to a mixed gas of oxygen and nitrogen, and the mixed gas was continuously passed through the furnace core tube at a flow rate of 1 L/minute. The oxygen concentration in the mixed gas is 4 vol. %. After switching to the mixed gas, the temperature inside the furnace was raised to a temperature set for heating of 350° C. The temperature was raised at a rate of 10° C./min to 330° C., which was a temperature 20° C. lower than the temperature set for heating, and then at a rate of 1° C./min from 330° C. to the temperature set for heating of 350° C. The oxygen oxidation treatment was then performed on the nanodiamond powder in the furnace while maintaining the temperature condition inside the furnace at 350° C. The duration of the treatment was 3 hours. In this manner, the nanodiamond powder subjected to the oxygen oxidation or oxygen oxidation treatment was obtained.

Next, hydrogenation was performed using the gas atmosphere furnace described above. Specifically, the nanodiamond powder that had been subjected to oxygen oxidation was placed inside the gas atmosphere furnace, and nitrogen gas was continuously provided through at a flow rate of 1 L/minute for 30 minutes. Then, the flowing gas was switched from nitrogen to a mixed gas of hydrogen and nitrogen, and the mixed gas was continuously provided through the furnace core tube at a flow rate of 1 L/minute. The hydrogen concentration in the mixed gas was 2 vol. %. After switching to the mixed gas, the temperature inside the furnace was raised to a temperature set for heating of 600° C. The temperature rising rate was 10° C./minute. The hydrogen oxidation treatment was then performed on the nanodiamond powder in the furnace while maintaining the temperature condition inside the furnace at 600° C. The duration of the treatment was 5 hours. In this manner, a nanodiamond powder subjected to the hydrogen oxidation of hydrogen oxidation treatment was obtained.

The disintegration was then performed. Specifically, first, 0.9 g of the nanodiamond powder subjected to the hydrogenation and 29.1 ml of pure water were added to a 50 ml sample bottle and mixed to obtain about 30 ml of a slurry. Next, the slurry was subjected to a centrifugation (centrifugal force: 20000×g for 10 minutes) and then to an ultrasonic treatment. In the ultrasonic treatment, the slurry was subjected to ultrasonic irradiation for 2 hours using an ultrasonic irradiator (trade name "Ultrasonic Cleaner AS-3", available from AS ONE Corporation). Thereafter, bead milling was performed using a bead milling apparatus (trade name "Parallel 4-Tube Sand Grinder Model LSG-4U-2L", available from Aimex Co., Ltd.). Specifically, 30 ml of the slurry after the ultrasonic irradiation and zirconia beads with a diameter of 30 μm were charged in a 100-ml vessel (available from Aimex Co., Ltd.), which was the mill vessel, and the vessel was sealed. Then, the apparatus was operated to perform bead milling. In this bead milling, the amount of zirconia beads that were charged was, for example, 33% of the capacity of the mill container, the rotational speed of the mill container was 2570 rpm, and the duration of the milling was 2 hours.

Next, the slurry or suspension subjected to the disintegration as described above was subjected to a centrifugation treatment (classification operation) with the use of a centrifuge. The centrifugal force in this centrifugation treatment was 20000×g, and the duration of the centrifugation was 10 minutes. Next, 10 ml of supernatant of the nanodiamond-containing solution that had been subjected to this centrifugation treatment was collected. In this manner, a nanodiamond dispersion in which the nanodiamond was dispersed in pure water was obtained. This nanodiamond dispersion was 2.1% by mass in solid content concentration or nanodiamond concentration, with pH of 8.07.

Particle Diameter D50

For the nanodiamond dispersion obtained in this manner, the particle size distribution of the nanodiamond was measured by a dynamic light scattering method. Specifically, the particle size distribution of the nanodiamonds was measured by dynamic light scattering (non-contact backscattering) using an instrument (trade name "Zetasizer Nano ZS") available from Malvern Panalytical Ltd. The nanodiamond dispersion for the measurement was 2.1% by mass in solid content concentration or nanodiamond concentration, and subjected to ultrasonic irradiation with an ultrasonic cleaner. As the measurement results, the particle diameter D50 (median diameter) of the nanodiamond was 5.05 nm, and the particle diameter D90 of the nanodiamond was 7.54 nm.

Zeta Potential

The zeta potential for the nanodiamond particles contained in the nanodiamond dispersion obtained in the manner described above was measured by Laser Doppler type electrophoresis using an instrument (trade name "Zetasizer Nano ZS") available from Malvern Panalytical Ltd. The nanodiamond dispersion for the measurement was prepared by dilution with ultrapure water to a solid content concentration or a nanodiamond concentration of 0.2% by mass, followed by ultrasonic irradiation with an ultrasonic cleaner. The temperature when measuring the zeta potential was 25° C. As the measurement result, the zeta potential of the nanodiamond dispersion was 41.8 mV.

Measurement of Electric Conductivity

For the nanodiamond dispersion obtained in the manner described above, the electric conductivity was measured at a measurement temperature of 25° C. with the use of an electric conductivity measuring device (trade name "TWIN-COND B-771", from Horiba, Ltd.). The nanodiamond dispersion for the measurement was 2.1% by mass in solid content concentration or nanodiamond concentration, and subjected to ultrasonic irradiation with an ultrasonic cleaner. As the measurement result, the electric conductivity of the nanodiamond dispersion was 25.2 μS/cm·wt %.

[Nanodiamond Powder]

The nanodiamond dispersion obtained in the manner described above was evaporated to dryness with the use of an evaporator to obtain a nanodiamond powder. The vacuum heating IR measurement has confirmed that the surface of the nanodiamond powder has functional groups (e.g., $-NH_2$, $-OH$, $-COOH$, $-PH(=O)OH$, $-SH$, $-SO_3H$, $-SO_2H$, $-SiOH$) that may react with glycidol.

Production Example 2

Preparation of Powder from Dried ζ-Negative Single-Digit Nanodiamond Dispersion

[Nanodiamond Dispersion]

Air-cooled detonated nanodiamond soot (from ALIT in Czech) of 4 to 6 nm in primary particle size of nanodiamond was used as the nanodiamond crude product. The air-cooled detonated nanodiamond soot was weighed to be 220 g, with 10.7 L of a 10% hydrochloric aqueous solution added thereto, and then heated under reflux for 1 hour (acid treatment). After cooling, washing was performed by decantation, and washing was performed until the pH of the precipitation liquid reached 2.5, and the supernatant was removed. Next, 4725 g of a 98% sulfuric acid and 50 g of ultrapure water were added to 1625 g of the precipitation liquid (solid content: 125 g) (40° C. or lower). This liquid was, with 3050 g of a chromium acid aqueous solution (1500 g of a chromic acid) added thereto, heated under reflux (internal temperature: 141° C.) for 5 hours, and then cooled to obtain a slurry liquid of 9450 g (oxidation treatment). Thereafter, washing was performed by decantation, and washing was performed until the color of the supernatant disappeared, and the supernatant was removed as much as possible to obtain a precipitation liquid.

The precipitation liquid obtained as mentioned above, with 1 L of a 10% sodium hydroxide aqueous solution added thereto, was then subjected to a heat treatment under reflux for 1 hour. After cooling, the supernatant was removed by decantation, the pH was then adjusted to 2.5 by adding a 20% hydrochloric acid, and thereafter, washing was performed by centrifugal precipitation. Ultrapure water was added to the final centrifugal precipitate to adjust the solid content concentration to 8%, and the pH was adjusted to 10 with a sodium hydroxide to obtain a pre-dispersion slurry. The pre-dispersion slurry mentioned above was subjected to bead mill dispersion. For the dispersion, a wet disperser (trade name "Ultra Apex Mill UAM-015", from KOTO-BUKI KOGYOU CO., LTD.) was used. After the wet disperser with zirconia beads of 0.03 mm in diameter as disintegration media up to 60% of the volume of the grinding vessel, 300 mL of the pre-dispersion slurry mentioned above was circulated at a flow rate of 10 L/h, and the circumferential speed of the wet disperser was set to 10 m/s to perform disintegration for 90 minutes. Thereafter, the disintegration liquid was collected, and the coarse particles were removed by a classification operation through centrifugation to obtain a nanodiamond aqueous dispersion (particle size distribution D50=5.4 nm).

Particle Diameter D50

For the nanodiamond aqueous dispersion obtained in the manner described above, the nanodiamond particle size distribution was measured by the same method as mentioned above. As a result of the measurement, the particle diameter D50 (median diameter) of the nanodiamond was 5.4 nm.

Zeta Potential

The zeta potential for the nanodiamond particles contained in the nanodiamond aqueous dispersion obtained in the manner described above was measured by the same method as mentioned above. As a result of the measurement, the zeta potential of the nanodiamond aqueous dispersion was −41 mV.

[Nanodiamond Powder]

The nanodiamond aqueous dispersion obtained in the manner described above was evaporated to dryness with the use of an evaporator to obtain a nanodiamond powder.

The powder was subjected to a solid $^{13}$C-NMR analysis by the following measurement method. In the solid $^{13}$C-NMR analysis, the proportions of respective carbon atoms were 16.6% for hydroxyl group bonded carbon (C—OH), 0.5% for carboxyl carbon (C(=O)O), 0.4% for carbonyl carbon (C=O), 14.7% for hydrogen bonded carbon, and 67.8% for sp$^3$ carbon relative to all of the carbon atoms included in the nanodiamond.

Solid $^{13}$C-NMR Analysis

The solid $^{13}$C-NMR analysis was performed by solid NMR method employed with the use of a solid NMR apparatus (trade name "CMX-300 Infinity", from Chemagnetics). Here are the measurement method and the conditions involved in the measurement: measurement method: DD/MAS method, measurement nuclear frequency: 75.188829 MHz ($^{13}$C nuclei), spectral width: 30.003 kHz, pulse width: 4.2 μsec (90° pulse), pulse repetition time: ACQTM 68. 26 msec, PD 15 sec, observation point: 2048 (data point: 8192), reference material: polydimethylsiloxane (external standard: 1.56 ppm), temperature: room temperature (about 22° C.), sample rotation frequency: 8.0 kHz Next, in the following Examples, the nanodiamond obtained as mentioned above was subjected to ring-opening addition polymerization with glycidol to produce a surface-modified nanodiamond modified with a group containing a polyglycerin chain at its surface. The surface-modified nanodiamonds obtained in the examples were evaluated for the following items.

Solid Content Concentration

For the surface-modified nanodiamond dispersion obtained in the manner described above, the solid content concentration was measured in the following manner. Specifically, a Teflon sheet was put on a beaker, several grams of the dispersion (sample) obtained as mentioned above, placed thereon, was treated with a 250° C. sand bath for several hours, dried to some extent, and then subjected to vacuum drying at 70° C. overnight, and the solid content concentration was determined from the weight of the remaining solid content.

Particle Size Measurement

For the surface-modified nanodiamond dispersion obtained in the manner described above, the particle size distribution of the surface-modified nanodiamond was measured by a dynamic light scattering method. Specifically, the particle size distribution of the surface-modified nanodiamond was measured by a dynamic light scattering method (non-contact backscattering method) with the use of an instrument (trade name "Nanotrac Wave II" from Microtrac-BEL).

Modification Ratio of Modifying Group

The ratio (modifying group weight/ND weight) of modifying group to nanodiamond (ND) was determined with the use of TG/DTA (quartz pan, 30 to 800° C., rate of temperature rise: 20° C./min) for surface-modified nanodiamond (the solid of the dispersion dried) in the surface-modified nanodiamond dispersion obtained in the manner described above.

Sodium Nitrate Aqueous Solution Mixing Test

To the surface-modified nanodiamond dispersion obtained in the manner described above, a 0.5M-NaNO$_3$ aqueous solution was added such that the amount thereof was 20 times as large as that of the dispersion, and the presence or absence of turbidity or precipitation was observed.

GPC Measurement

The surface-modified nanodiamond dispersion obtained in the manner described above was subjected to a GPC measurement under the following conditions:

Analyzer: 10A from SHIMADZU CORPORATION
Column: Shodex SB-806×2+802.5 with Guard
Column Temperature: 40° C.
Eluent: 0.5M-NaNO$_3$ aqueous solution
Flow Rate: 0.6 mL/min
Detection: Shodex RI-101 (40° C.) Porlarity (+) or UV254
Injection Volume: 50 μL
Sample Concentration: 0.5% (n=2 created, n=1 measured) (the sample obtained by mixing Milli-Q water in an amount equivalent to the obtained 1% aqueous solution to prepare a 0.5% aqueous solution and filtering the prepared solution through a 0.45 μm filter was used as an evaluation sample)
Reference Sample: Easi Vial PEG/PEO Example 1

Under a nitrogen atmosphere, a dispersion obtained by mixing 13.5 g of n-propanol and 0.1 g of the nanodiamond powder obtained in Production Example 1 was heated to 70° C. Into this dispersion, 13.5 g of glycidol was delivered by drops over 1 hour while maintaining 70° C., and after the completion of the dropping, the mixture was subjected to aging for 10 hours at the same temperature. After the completion of the aging, the mixture was cooled to room temperature, and the same amount of water as the liquid reaction mixture was added to the liquid reaction mixture to stop the reaction. Thereafter, the liquid reaction mixture was purified with the use of a UF membrane (trade name "Amicon Bioseparations" from Millipore, made of polyether sulfone, molecular weight cut off: 30000). The purification was completed when the total dilution factor reached a million times by repetition of the permeation (solid-liquid separation with the use of a membrane)-dilution [addition of water to the remaining upper layer (valuables)]. In this manner, a dispersion of the surface-modified nanodiamond modified with a group containing a polyglycerin chain was obtained.

For the surface-modified nanodiamond dispersion obtained as mentioned above, the particle size distribution of the surface-modified nanodiamond was measured by a dynamic light scattering method, with the result that the particle diameters D10, D50 (median diameter), and D90 were respectively 31 nm, 52 nm, and 169 nm. For the surface-modified nanodiamond in the surface-modified nanodiamond dispersion obtained as mentioned above, the result of measuring the modification ratio of the modifying group was 1.8. Furthermore, as a result of performing a sodium nitrate aqueous solution mixing test on the surface-modified nanodiamond dispersion obtained as mentioned above, no turbidity or precipitation was observed.

Example 2

The same operations as in Example 1 were performed except for the aging time of 4 hours, and a dispersion of a surface-modified nanodiamond with a surface modified with a group containing a polyglycerin chain was obtained.

The solid content concentration of the surface-modified nanodiamond dispersion obtained as mentioned above was measured and determined to be 2.02% by weight. In addition, for the surface-modified nanodiamond dispersion obtained as mentioned above, the particle size distribution of the surface-modified nanodiamond was measured by a dynamic light scattering method, with the result that the particle diameters D10, D50 (median diameter), and D90 were respectively 28 nm, 49 nm, and 188 nm. For the surface-modified nanodiamond in the surface-modified nanodiamond dispersion obtained as mentioned above, the result of measuring the modification ratio of the modifying group was 1.0. Furthermore, as a result of performing a sodium nitrate aqueous solution mixing test on the surface-modified nanodiamond dispersion obtained as mentioned above, cloudiness or precipitation was slightly observed.

Example 3

The same operations as in Example 1 were performed except for the aging time of 6 hours, and a dispersion of a surface-modified nanodiamond with a surface modified with a group containing a polyglycerin chain was obtained.

The solid content concentration of the surface-modified nanodiamond dispersion obtained as mentioned above was measured and determined to be 2.46% by weight. In addition, for the surface-modified nanodiamond dispersion obtained as mentioned above, the particle size distribution of the surface-modified nanodiamond was measured by a dynamic light scattering method, with the result that the particle diameters D10, D50 (median diameter), and D90 were respectively 25 nm, 43 nm, and 83 nm. For the surface-modified nanodiamond in the surface-modified nanodiamond dispersion obtained as mentioned above, the result of measuring the modification ratio of the modifying group was 1.3. Furthermore, as a result of performing a sodium nitrate aqueous solution mixing test on the surface-modified nanodiamond dispersion obtained as mentioned above, no turbidity or precipitation was observed.

Example 4

The same operations as in Example 1 were performed except that the same amount of ethylene glycol was used instead of n-propanol, and a dispersion of a surface-modified nanodiamond with a surface modified with a group containing a polyglycerin chain was obtained.

For the surface-modified nanodiamond dispersion obtained as mentioned above, the particle size distribution of the surface-modified nanodiamond was measured by a dynamic light scattering method, with the result that the particle diameters D10, D50 (median diameter), and D90 were respectively 23 nm, 40 nm, and 78 nm. For the surface-modified nanodiamond in the surface-modified nanodiamond dispersion obtained as mentioned above, the result of measuring the modification ratio of the modifying group was 0.7. Furthermore, as a result of performing a sodium nitrate aqueous solution mixing test on the surface-modified nanodiamond dispersion obtained as mentioned above, no turbidity or precipitation was observed.

Example 5

The same operations as in Example 4 were performed except for the reaction temperature of 150° C. and the aging time of 1 hour, and a dispersion of a surface-modified nanodiamond with its surface modified with a group containing a polyglycerin chain was obtained.

The solid content concentration of the surface-modified nanodiamond dispersion obtained as mentioned above was measured and determined to be 2.68% by weight. In addition, for the surface-modified nanodiamond dispersion obtained as mentioned above, the particle size distribution of the surface-modified nanodiamond was measured by a dynamic light scattering method, with the result that the particle diameters D10, D50 (median diameter), and D90 were respectively 21 nm, 36 nm, and 78 nm. For the surface-modified nanodiamond in the surface-modified nanodiamond dispersion obtained as mentioned above, the result of measuring the modification ratio of the modifying group was 0.5. Furthermore, as a result of performing a sodium nitrate aqueous solution mixing test on the surface-modified nanodiamond dispersion obtained as mentioned above, no turbidity or precipitation was observed.

Example 6

The same operations as in Example 4 were performed except for the reaction temperature of 100° C., the aging time of 4 hours, and the amount of glycidol of 6.75 g, and a dispersion of a surface-modified nanodiamond with its surface modified with a group containing a polyglycerin chain was obtained.

The solid content concentration of the surface-modified nanodiamond dispersion obtained as mentioned above was measured and determined to be 1.75% by weight. In addition, for the surface-modified nanodiamond dispersion obtained as mentioned above, the particle size distribution of the surface-modified nanodiamond was measured by a dynamic light scattering method, with the result that the particle diameters D10, D50 (median diameter), and D90 were respectively 22 nm, 37 nm, and 67 nm. For the surface-modified nanodiamond in the surface-modified nanodiamond dispersion obtained as mentioned above, the result of measuring the modification ratio of the modifying group was 0.7. Furthermore, as a result of performing a sodium nitrate aqueous solution mixing test on the surface-modified nanodiamond dispersion obtained as mentioned above, no turbidity or precipitation was observed.

Example 7

The same operations as in Example 4 were performed except for the reaction temperature of 100° C., the aging time of 4 hours, and the amount of the nanodiamond powder for 0.5 g, and a dispersion of a surface-modified nanodiamond with its surface modified with a group containing a polyglycerin chain was obtained.

The solid content concentration of the surface-modified nanodiamond dispersion obtained as mentioned above was measured and determined to be 1.97% by weight. In addition, for the surface-modified nanodiamond dispersion obtained as mentioned above, the particle size distribution of the surface-modified nanodiamond was measured by a dynamic light scattering method, with the result that the particle diameters D10, D50 (median diameter), and D90 were respectively 21 nm, 38 nm, and 68 nm. For the surface-modified nanodiamond in the surface-modified nanodiamond dispersion obtained as mentioned above, the result of measuring the modification ratio of the modifying group was 0.9. Furthermore, as a result of performing a sodium nitrate aqueous solution mixing test on the surface-modified nanodiamond dispersion obtained as mentioned above, no turbidity or precipitation was observed.

Example 8

The same operations as in Example 4 were performed except for the following: 100° C. for the reaction temperature, 4 hours for the aging time, 2.2 g for the amount of the raw material nanodiamond powder, 59.6 g for the amount of ethylene group, 59.6 g for the amount of glycidol, and 5 hours for the aging time, and a dispersion of a surface-modified nanodiamond with its surface modified with a group containing a polyglycerin chain was obtained.

The solid content concentration of the surface-modified nanodiamond dispersion obtained as mentioned above was measured and determined to be 1.94% by weight. In addition, for the surface-modified nanodiamond dispersion obtained as mentioned above, the particle size distribution of the surface-modified nanodiamond was measured by a dynamic light scattering method, with the result that the particle diameters D10, D50 (median diameter), and D90 were respectively 22 nm, 37 nm, and 69 nm. For the surface-modified nanodiamond in the surface-modified nanodiamond dispersion obtained as mentioned above, the result of measuring the modification ratio of the modifying group was 0.9. Furthermore, as a result of performing a sodium nitrate aqueous solution mixing test on the surface-modified nanodiamond dispersion obtained as mentioned above, no turbidity or precipitation was observed.

Example 9

The same operations as in Example 1 were performed except that the nanodiamond powder obtained according to Production Example 2 was used instead of the nanodiamond powder obtained according to Production Example 1, and a dispersion of a surface-modified nanodiamond with a surface modified with a group containing a polyglycerin chain was obtained.

The solid content concentration of the surface-modified nanodiamond dispersion obtained as mentioned above was measured and determined to be 4.21% by weight. In addition, for the surface-modified nanodiamond dispersion obtained as mentioned above, the particle size distribution of the surface-modified nanodiamond was measured by a dynamic light scattering method, with the result that the particle diameters D10, D50 (median diameter), and D90 were respectively 3.9 nm, 5.0 nm, and 8.5 nm. For the surface-modified nanodiamond in the surface-modified nanodiamond dispersion obtained as mentioned above, the result of measuring the modification ratio of the modifying group was 2.3. Furthermore, as a result of performing a sodium nitrate aqueous solution mixing test on the surface-modified nanodiamond dispersion obtained as mentioned above, no turbidity or precipitation was observed.

Comparative Example 1

The same operations as in Example 1 were performed except that the same amount of pyridine was used instead of n-propanol, and a straight black slurry solution was obtained. The obtained dispersion was subjected to a sodium nitrate aqueous solution mixing test, and precipitates were generated. The nanodiamond surface is presumed to have failed to be modified with any polyglycerin.

Comparative Example 2

When N,N-dimethylformamide and glycidol were mixed, the mixture was colored to give a yellow color, and no experiment with nanodiamond used was thus performed.

Comparative Example 3

When dimethyl sulfoxide and glycidol were mixed, the mixture was colored to give a yellow color, and no experiment with nanodiamond used was thus performed.

Reference Example 1

Known Formulation

In accordance with the method according to Production Example 1 of Patent Document 5, a dispersion of a surface-modified nanodiamond with a surface modified with a group containing a polyglycerin chain was obtained.

The solid content concentration of the surface-modified nanodiamond dispersion obtained as mentioned above was measured and determined to be 2.22% by weight. In addition, for the surface-modified nanodiamond dispersion obtained as mentioned above, the particle size distribution of the surface-modified nanodiamond was measured by a dynamic light scattering method, with the result that the particle diameters D10, D50 (median diameter), and D90 were respectively 20.0 nm, 34.5 nm, and 66.3 nm. For the surface-modified nanodiamond in the surface-modified nanodiamond dispersion obtained as mentioned above, the result of measuring the modification ratio of the modifying group was 1.1. Furthermore, as a result of performing a sodium nitrate aqueous solution mixing test on the surface-modified nanodiamond dispersion obtained as mentioned above, no turbidity or precipitation was observed.

Variations of the invention according to the present invention will be described below.

[Appendix 1] A method for producing a surface-modified nanodiamond, the method including subjecting a nanodiamond or a surface-modified nanodiamond to ring-opening addition polymerization with glycidol in an aliphatic alcohol solvent having from 2 to 4 carbon atoms, the surface-modified nanodiamond having its surface modified with a group represented by Formula (1):

$$-X^1-H \qquad (1)$$

where in Formula (1), $X^1$ represents —NH—, —O—, —COO—, —PH(=O)O—, —S—, —SO$_3$—, —SO$_2$—, or —SiO—, so as to obtain a surface-modified nanodiamond having its surface modified with a group containing a polyglycerin chain represented by Formula (2):

$$—X—R \qquad (2)$$

where in Formula (2), X represents a single bond, —NH—, —O—, —COO—, —PH(=O)O—, —S—, —SO$_3$—, —SO$_2$—, or —SiO—, and R represents a polyglyceryl group.

[Appendix 2] The method for producing a surface-modified nanodiamond according to Appendix 1, wherein the nanodiamond may be produced by any method such as a detonation method, a high-temperature high-pressure method, a static high-pressure method, and a fluxing method, and is preferably derived from a diamond produced by a detonation method (in particular, an oxygen-deficient detonation method), and preferably derived from a diamond synthesized by, in particular, an air-cooling detonation method.

[Appendix 3] The method for producing a surface-modified nanodiamond according to Appendix 1 or 2, wherein the particle diameter D50 (median diameter) of the nanodiamond (ND) is from 3 to 200 nm, preferably from 7 to 100 nm, more preferably from 10 to 40 nm.

[Appendix 4] The method for producing a surface-modified nanodiamond according to any one of Appendices 1 to 3, wherein the particle diameter D50 (median diameter) of the raw material nanodiamond (ND) or hydrogenated nanodiamond (ND-H) for producing the surface-modified nanodiamond is from 3 to 200 nm, preferably from 7 to 100, more preferably from 10 to 40 nm.

[Appendix 5] The method for producing a surface-modified nanodiamond according to any one of Appendices 1 to 4, wherein a reaction is conducted on heating by sequentially adding glycidol to a liquid mixture of the aliphatic alcohol solvent having from 2 to 4 carbon atoms and the raw material nanodiamond or surface-modified nanodiamond.

[Appendix 6] The method for producing a surface-modified nanodiamond according to any one of Appendices 1 to 5, wherein the aliphatic alcohol having from 2 to 4 carbon atoms is an aliphatic polyhydric alcohol, preferably an aliphatic alcohol having from 2 to 3 carbon atoms.

[Appendix 7] The method for producing a surface-modified nanodiamond according to Appendix 6, wherein the aliphatic alcohol having from 2 to 4 carbon atoms is preferably an aliphatic monohydric alcohol of ethanol, propanol, isopropyl alcohol, n-butanol, isobutyl alcohol, sec-butyl alcohol, or tert-butyl alcohol; or an ethylene glycol, a propylene glycol, a 1,3-propanediol, a 1,3-butanediol, a 1,4-butanediol, or a glycerin.

[Appendix 8] The method for producing a surface-modified nanodiamond according to any one of Appendices 1 to 7, wherein the raw material nanodiamond or surface-modified nanodiamond is a solid (such as a powder) obtained by drying a potential positive nanodiamond dispersion (preferably, a ζ-potential positive single-digit nanodiamond dispersion), or a solid (such as a powder) obtained by drying a potential negative nanodiamond dispersion (preferably, a ζ-potential negative single-digit nanodiamond dispersion).

[Appendix 9] The method for manufacturing a surface-modified nanodiamond according to Appendix 8, wherein the ζ-potential positive (that is, the ζ-potential has a positive value) nanodiamond dispersion preferably has a potential of 30 mV or higher, more preferably 35 mV or higher, even more preferably 40 mV or higher.

[Appendix 10] The method for manufacturing a surface-modified nanodiamond according to Appendix 8, wherein the ζ-potential negative (that is, the potential has a negative value) nanodiamond dispersion preferably has a potential of −30 mV or lower, more preferably −35 mV or lower, even more preferably −40 mV or lower

[Appendix 11] The method for producing a surface-modified nanodiamond according to any one of Appendices 1 to 10, wherein the aliphatic alcohol solvent having from 2 to 4 carbon atoms is used in an amount preferably from 10 to 2000 parts by weight, more preferably from 15 to 300 parts by weight, even more preferably from 20 to 200 parts by weight, relative to 1 part by weight of the raw material nanodiamond or surface-modified nanodiamond.

[Appendix 12] The method for producing a surface-modified nanodiamond according to any one of Appendices 1 to 11, wherein the glycidol is used in an amount preferably from 10 to 2000 parts by weight, more preferably from 15 to 300 parts by weight, even more preferably from 20 to 200 parts by weight, relative to 1 part by weight of the raw material nanodiamond or surface-modified nanodiamond for use.

[Appendix 13] The method for producing a surface-modified nanodiamond according to any one of Appendices 5 to 12, wherein the reaction is conducted by sequentially adding the glycidol at a heating temperature of preferably from 40 to 180° C., more preferably from 60 to 150° C., even more preferably from 80 to 125° C.

[Appendix 14] The method for producing a surface-modified nanodiamond according to any one of Appendices 5 to 13, wherein the reaction with the glycidol sequentially added is preferably conducted under an inert gas atmosphere.

[Appendix 15] The method for producing a surface-modified nanodiamond according to any one of Appendices 5 to 14, wherein a catalyst may be used for the reaction with the glycidol sequentially added, and the catalyst may be added in advance to the liquid mixture of the aliphatic alcohol solvent having from 2 to 4 carbon atoms and the raw material nanodiamond or surface-modified nanodiamond, or may be added sequentially to the liquid mixture in the sequential addition of the glycidol.

[Appendix 16] The method for producing a surface-modified nanodiamond according to any one of Appendices 5 to 15, wherein the catalyst may be either an acidic catalyst or a basic catalyst, and the acidic catalyst is preferably a boron trifluoride etherate, an acetic acid, or an phosphoric acid, and the basic catalyst is preferably a triethylamine, a pyridine, a dimethylaminopyridine, or a triphenylphosphine.

[Appendix 17] The method for producing a surface-modified nanodiamond according to any one of Appendices 5 to 16, wherein a time for sequentially adding the glycidol is preferably from 10 minutes to 24 hours, more preferably from 20 minutes to 2 hours.

[Appendix 18] The method for producing a surface-modified nanodiamond according to any one of Appendices 5 to 17, wherein an aging time after completing the sequential addition of the glycidol is preferably from 10 minutes to 24 hours, more preferably from 20 minutes to 6 hours.

[Appendix 19] The method for producing a surface-modified nanodiamond according to any one of Appendices 1 to 18, wherein a ratio of a surface-modifying group to the nanodiamond (ND) (modifying group weight/ND weight) (=modification ratio), obtained by TG/DTA measurement of the surface-modified nanodiamond, is preferably from 0.2 to 3.0, more preferably from 0.4 to 2.4, even more preferably from 0.6 to 1.8.

[Appendix 20] The method for producing a surface-modified nanodiamond according to any one of Appendices 1 to 19, wherein the surface-modified nanodiamond preferably has a particle diameter D50 (median diameter) as obtained by DLS (dynamic light scattering) from 20 to 60 nm, more preferably from 30 to 50 nm.

[Appendix 21] The method for producing a surface-modified nanodiamond according to any one of Appendices 1 to 20, wherein the surface-modified nanodiamond causes no precipitation or turbidity upon mixing with a sodium nitrate aqueous solution.

[Appendix 22] The method for producing a surface-modified nanodiamond according to any one of Appendices 1 to 21, wherein in a GPC measurement of the surface-modified nanodiamond, a main component peak has approximately the same position (retention time) and shape as a known formulation (Production Example 1 of Patent Document 5), and no other by-products (impurities) are detected.

The invention claimed is:

1. A method for producing a surface-modified nanodiamond, the method comprising subjecting a nanodiamond or a surface-modified nanodiamond to ring-opening addition polymerization with glycidol in an aliphatic alcohol solvent having from 2 to 4 carbon atoms, the surface-modified nanodiamond having its surface modified with a group represented by Formula (1):

wherein in Formula (1), $X^1$ represents —NH—, —O—, —COO—, —PH(=O)O—, —S—, —SO$_3$—, —SO$_2$—, or —SiO—, to obtain a surface-modified nanodiamond having its surface modified with a group containing a polyglycerin chain represented by Formula (2):

wherein in Formula (2), X represents a single bond, —NH—, —O—, —COO—, —PH(=O))—, —S—, —SO$_3$—, —SO$_2$—, or —SiO—, and R represents a polyglyceryl group.

2. The method for producing a surface-modified nanodiamond according to claim 1, wherein the reaction is conducted on heating by sequentially adding glycidol to a liquid mixture of the aliphatic alcohol solvent having from 2 to 4 carbon atoms and the raw material nanodiamond or surface-modified nanodiamond.

3. The method for producing a surface-modified nanodiamond according to claim 1, wherein the raw material nanodiamond or surface-modified nanodiamond is a powder obtained by drying a ζ-potential positive single-digit nanodiamond dispersion having nanodiamond particles of less than 10 nm in particle diameter D50 (mean diameter).

4. The method for producing a surface-modified nanodiamond according to claim 1, wherein the aliphatic alcohol solvent having from 2 to 4 carbon atoms is used in an amount of from 10 to 2000 parts by weight relative to 1 part by weight of the raw material nanodiamond or surface-modified nanodiamond.

5. The method for producing a surface-modified nanodiamond according to claim 1, wherein the glycidol is used in an amount of from 10 to 2000 parts by weight relative to 1 part by weight of the raw material nanodiamond or surface-modified nanodiamond.

6. The method for producing a surface-modified nanodiamond according to claim 1, wherein the ring-opening addition polymerization is conducted at a temperature from 40 to 180° C.

7. The method for producing a surface-modified nanodiamond according to claim 2, wherein the raw material nanodiamond or surface-modified nanodiamond is a powder obtained by drying a ζ-potential positive single-digit nanodiamond dispersion having nanodiamond particles of less than 10 nm in particle diameter D50 (mean diameter).

8. The method for producing a surface-modified nanodiamond according to claim 2, wherein the aliphatic alcohol solvent having from 2 to 4 carbon atoms is used in an amount of from 10 to 2000 parts by weight relative to 1 part by weight of the raw material nanodiamond or surface-modified nanodiamond.

9. The method for producing a surface-modified nanodiamond according to claim 3, wherein the aliphatic alcohol solvent having from 2 to 4 carbon atoms is used in an amount of from 10 to 2000 parts by weight relative to 1 part by weight of the raw material nanodiamond or surface-modified nanodiamond.

10. The method for producing a surface-modified nanodiamond according to claim 7, wherein the aliphatic alcohol solvent having from 2 to 4 carbon atoms is used in an amount of from 10 to 2000 parts by weight relative to 1 part by weight of the raw material nanodiamond or surface-modified nanodiamond.

11. The method for producing a surface-modified nanodiamond according to claim 2, wherein the glycidol is used in an amount of from 10 to 2000 parts by weight relative to 1 part by weight of the raw material nanodiamond or surface-modified nanodiamond.

12. The method for producing a surface-modified nanodiamond according to claim 3, wherein the glycidol is used in an amount of from 10 to 2000 parts by weight relative to 1 part by weight of the raw material nanodiamond or surface-modified nanodiamond.

13. The method for producing a surface-modified nanodiamond according to claim 4, wherein the glycidol is used in an amount of from 10 to 2000 parts by weight relative to 1 part by weight of the raw material nanodiamond or surface-modified nanodiamond.

14. The method for producing a surface-modified nanodiamond according to claim 7, wherein the glycidol is used in an amount of from 10 to 2000 parts by weight relative to 1 part by weight of the raw material nanodiamond or surface-modified nanodiamond.

15. The method for producing a surface-modified nanodiamond according to claim 2, wherein the ring-opening addition polymerization is conducted at a temperature from 40 to 180° C.

16. The method for producing a surface-modified nanodiamond according to claim 3, wherein the ring-opening addition polymerization is conducted at a temperature from 40 to 180° C.

17. The method for producing a surface-modified nanodiamond according to claim 4, wherein the ring-opening addition polymerization is conducted at a temperature from 40 to 180° C.

18. The method for producing a surface-modified nanodiamond according to claim 5, wherein the ring-opening addition polymerization is conducted at a temperature from 40 to 180° C.

19. The method for producing a surface-modified nanodiamond according to claim 7, wherein the ring-opening addition polymerization is conducted at a temperature from 40 to 180° C.

20. The method for producing a surface-modified nanodiamond according to claim 14, wherein the ring-opening addition polymerization is conducted at a temperature from 40 to 180° C.

* * * * *